April 14, 1959     J. M. HEIM     2,881,715
DOUGH MOLDING DEVICE

Filed Feb. 23, 1956     2 Sheets-Sheet 1

INVENTOR
JOHN M. HEIM
BY *Bradley Cohn*
ATTORNEY

April 14, 1959    J. M. HEIM    2,881,715
DOUGH MOLDING DEVICE
Filed Feb. 23, 1956    2 Sheets-Sheet 2

INVENTOR
JOHN M. HEIM
BY *Bradley Cohn*
ATTORNEY

2,881,715
DOUGH MOLDING DEVICE

John M. Heim, Chalfont, Pa., assignor to American Machine & Foundry Company, a corporation of New Jersey Application February 23, 1956, Serial No. 567,298

6 Claims. (Cl. 107—9)

This invention relates to a dough mold and more particularly to rolling dough string or noodles such as are used in pretzel tying. In pretzel tying machines, such for example as shown in the patent to Allen et al., No. 2,629,340 issued February 24, 1953, small slugs of dough are divided from a hopper and rolled into noodles between oppositely driven belt surfaces. The noodle is then delivered to a tying station.

A variety of types of pretzels have become popular. The noodles from which they are formed differ both in size and shape. Some are small, some large. Some are of uniform diameter throughout while others are formed from noodles of non-uniform diameter, principally noodles of relatively large center diameter tapered toward the ends. Because of the variety in size and conformation, it is desirable that a given pretzel machine be adaptable to producing more than one style of pretzel.

It is therefore an object of this invention to devise a noodle rolling or molding structure in which both the size and the relative dimensions of the noodle may be varied. It is accordingly an object of this invention to devise a noodle rolling apparatus that may be rapidly adjusted to rolling noodles ranging from very thin diameter to very large diameter.

It is a further object of this invention to devise such a noodle structure that may roll noodles ranging from noodles of uniform diameter to noodles of non-uniform diameter.

It is a particular object of this invention to devise a noodle rolling apparatus to roll noodles of relatively large center diameter tapering toward the ends.

It is likewise an object of the invention to devise a machine adaptable to any of the above objects alone or in combination.

Figure 1:
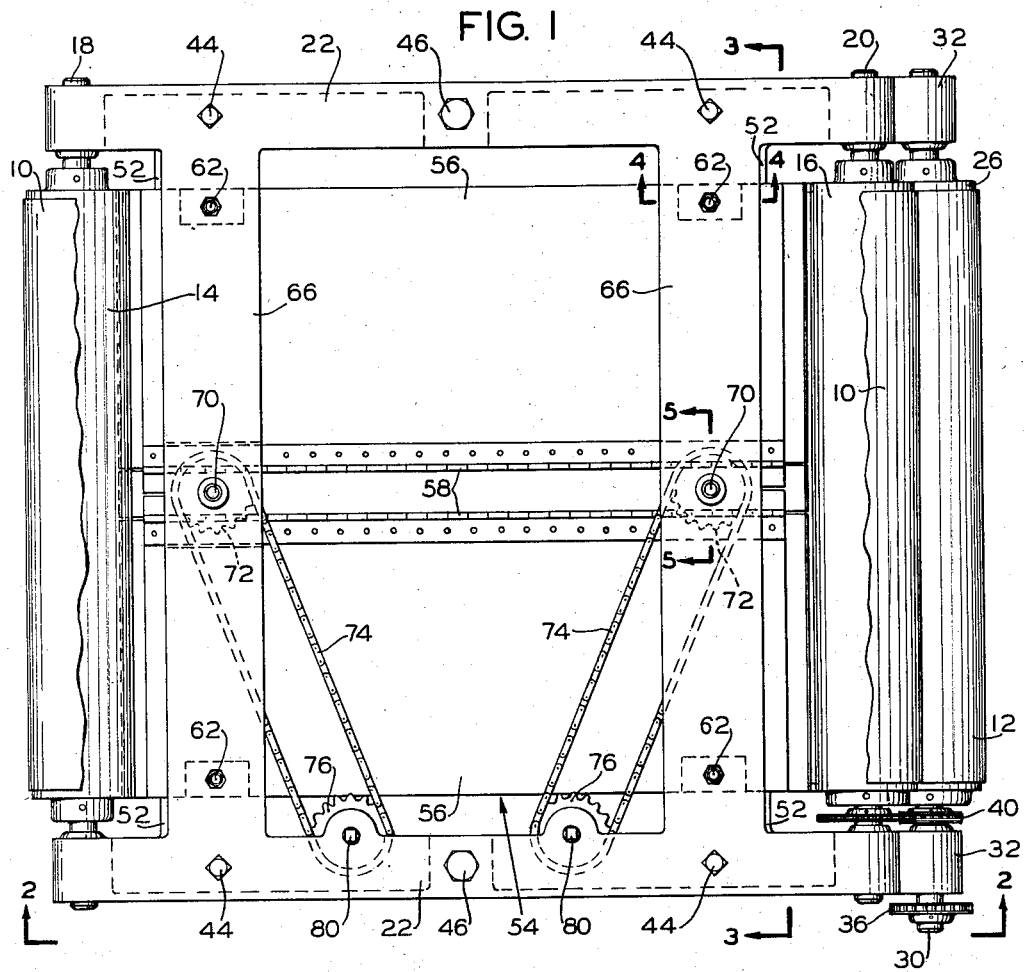
Fig. 1 is a plan view of the pretzel noodle rolling apparatus.

With reference to the drawings, the noodle rolling apparatus consists of a pair of wide endless molding belts 10 and 12 arranged in spaced parallelism with the lower run of belt 10 slightly above the upper run of belt 12. Belt 10 is supported by rollers 14 and 16 mounted on shafts 18 and 20, respectively. Both shafts are rotatably supported by a suitable frame 22. Lower belt 12 is supported by means of rollers 24 and 26 mounted on shafts 28 and 30, respectively, both of which are rotatably supported in a frame 32.

Figure 2:
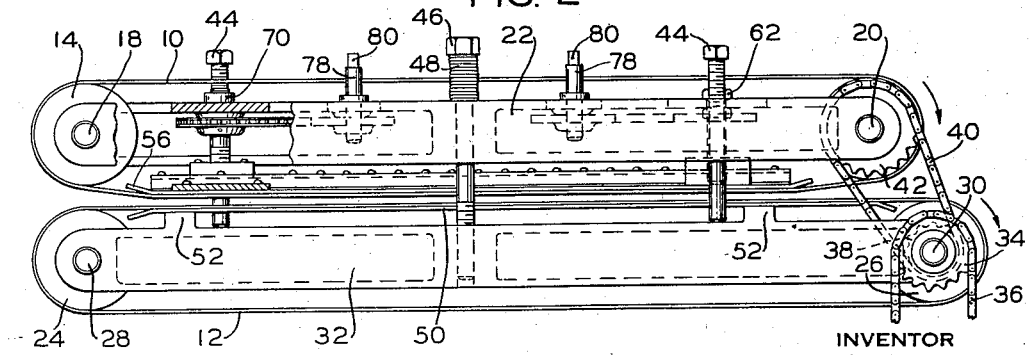
Fig. 2 is a side elevation of the same.

Shaft 30 carries a sprocket 34 which is constantly driven through a chain 36 from a suitable source of power. To shaft 30 is also secured a sprocket 38 which by means of a chain 40 drives a sprocket 42 mounted on the shaft 20 constituting the drive shaft of the upper belt 10. Since sprocket 38 is of a smaller diameter than sprocket 42 it is plainly seen that the lower belt 12 runs at a faster speed than the upper belt 10 and due to the arrangement, the two belts run in a clockwise direction as indicated by the arrows in Fig. 2.

The lower run of belt 10 and the upper run of belt 12 which are closely spaced from each other thus run in opposite directions with the lower belt, as mentioned, running at a higher speed. The dough lumps so placed between the belts at the left of Fig. 2 will be rotated between the belts in a counterclockwise direction but will be moved toward the right by the higher speed of lower belt 12. Thus the noodle will be molded by the transverse shape of belt 10 on which in fact it is rolled. It is obvious that a noodle will be conveyed from one end to the other so long as there is a speed differential between belts 10 and 12.

The space between the lower run of belt 10 and the upper run of belt 12 is regulated by means of a plurality of adjustable leg screws 44 which are held by the upper frame 22. Leg screws 44 rest on the top surface of the lower frame 32. In order to provide constant alignment as well as yieldability the upper and lower frame 22 and 32, respectively, are connected by means of a post 46 whose upper end is surrounded by a compression spring 48 confined between the head of the post 46 and the upper surface of frame 22.

The upper run of the lower belt 12 is supported by a plate 50 secured through transverse ribs 52 to the lower frame 32.

Figure 3:
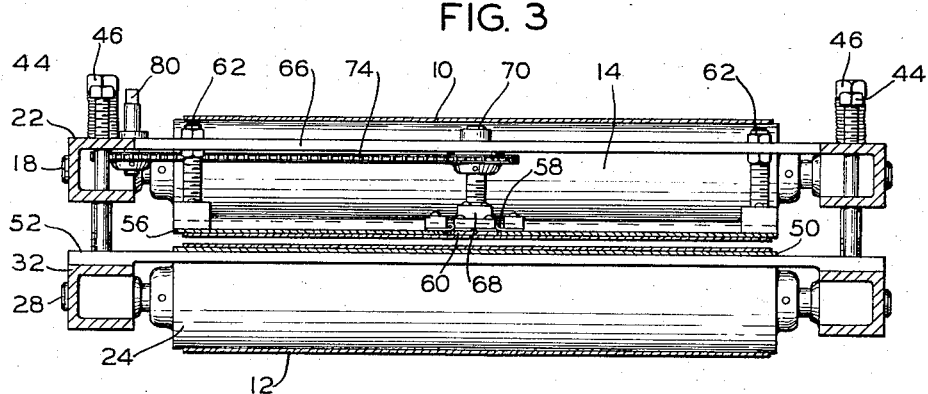
Fig. 3 is a sectional end elevation, taken on line 3—3 of Fig. 1.
Figure 4:
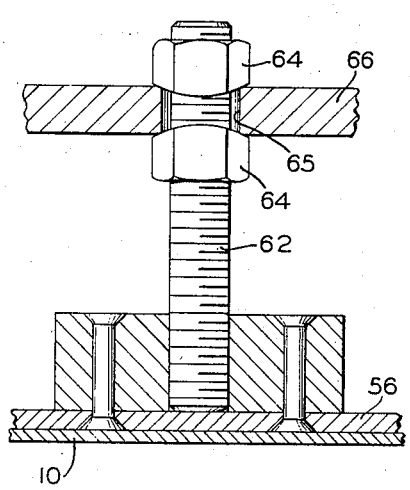
Fig. 4 is a partial sectional side elevation, taken on line 4—4 of Fig. 1 illustrating one of the adjustable side supports of the rolling board.
Figure 5:
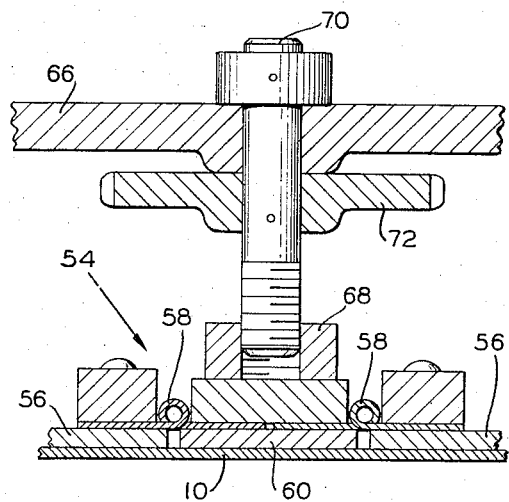
Fig. 5 is a partial sectional end elevation, taken on line 5—5 of Fig. 1 illustrating the adjustable hinged section of the noodle rolling board.
Figure 6:
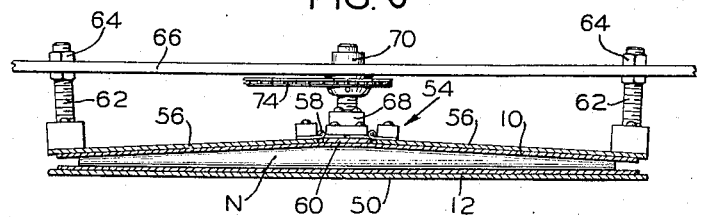
Fig. 6 is a sectional end elevation showing the rolling of a double tapered noodle by the multi-sectional hinged rolling board.

The lower run of the upper belt 10 is guided by means of an adjustable noodle rolling board 54. The latter consists of two wide plates 56 which by means of a pair of hinges 58 are connected to a center bar 60 arranged in such a manner as to form the longitudinal center portion of the entire rolling board 54. It is, of course, apparent that the hinges 58 could be any flexible means to provide adjustability in the rolling board 64. Furthermore, rolling board 64 itself could be flexible. Each of the two lateral plates 56 are supported adjacent their outward edges by means of threaded studs 62. The upper end of each stud 62 by means of a pair of suitable nuts 64 is adjustably secured to a transverse rib 66 of the upper frame 22. The center bar 60 (Figs. 1, 3 and 5) near each end carries a threaded block 68 which engages with the threaded end of a vertical stud shaft 70 which is rotatably supported by the transverse rib 66 of the upper frame 22. To the upper portion of each stud shaft 70 is secured a sprocket 72 which by means of a chain 74 is connected to a sprocket 76. Each sprocket 76 is mounted to a stud shaft 78 rotatably held by the upper frame 22. The upper free end of each stud shaft 78 is formed as a square portion 80 by means of which the attendant may turn the stud shaft and therefor sprocket 76. The turning of sprocket 76 raises or lowers the stud shaft 70 threaded in block 68 by rotation of the stud shaft 70 through chain 24 and sprocket 72. Since the two side boards 56 are connected to the center bar by the hinges 58 mentioned above, the noodle rolling board 54 will assume a concave or convex shape. The relative diameters of the dough noodle will accordingly taper toward the ends or toward the center as the case may be. The concave arrangement is illustrated in Fig. 6. It is believed that the reverse convex adjustment is obvious and does not require illustration.

In order to provide proper alignment of the guide board supporting studs 62, the contacting surfaces of the nut 64 are all convex and the holes 65 through which studs 62 extend are of slightly larger diameter so that said studs 62 may be moved from a vertical to an angular position toward or away from the center when the center bar 60 is raised or lowered.

I claim:

1. Apparatus for rolling dough noodles for pretzels, having in combination a lower endless belt, an upper endless belt spaced parallel to and above said lower endless belt, the upper run of said lower endless belt being supported substantially horizontally on a plate, the lower run of said upper endless belt being guided beneath an adjustable noodle rolling board, said belts being mounted for selective adjustment toward and away from each other, said noodle rolling board being formed of three flexibly joined longitudinally extending members, the central of said members being of relatively small width and the lateral members being substantially of greater width, adjustable supporting means mounting said central member to adjust its position upwardly and downwardly with respect to said upper belt in any adjusted position thereof toward and away from said lower belt, other means to support the outside lateral edges of said lateral members relative to said upper belt, and drive means for said belts to drive said belts in the same angular direction but at different rates of speed whereby a noodle may be rolled and molded between said belts and shaped by the transverse profile of said noodle rolling board.

2. In a pretzel noodle rolling and molding device having a horizontal lower endless belt and an upper horizontal endless belt spaced from said lower belt and substantially parallel thereto, a noodle rolling board in contact with the upper or inner surface of the lower run of said upper belt to guide and shape the transverse profile of said lower run, frame means supporting said upper endless belt, said frame means being adjustable relative to said lower belt, a threaded shaft engaging said frame means and a first portion of said rolling board so that rotation of said threaded shaft will vary the position of said engaged portion of said board relative to said frame, a sprocket secured to said shaft between the upper and lower runs of said upper belt, a chain running on said sprocket and extending out from said belt to a second sprocket outside said belt to permit rotational adjustment of said shaft from without said belt, mounting means engaging other portions of said rolling board whereby adjustment of said first portion by rotation of said shaft will flex said board and vary its transverse profile.

3. A device substantially as claimed in claim 2, further characterized by drive means driving said belts in the same rotary direction but at different speeds whereby a dough lump may be delivered from between the upper run of said lower belt and the lower run of said upper belt and shaped by the transverse profile of the lower run of said upper belt.

4. In a device for molding elongated plastic material, the combination of a pair of supporting frames mounted in parallel spaced adjacency, means to yieldably bias said frames toward each other, adjustable leg screws on one of said frames to adjustably space said frames from each other against the action of said biasing means, a pair of belt pulleys rotatively mounted in each of said frames, an endless belt trained over each pair of pulleys, guide plates underlying and supporting adjacently moving runs of said belts, at least one of said guide plates being flexibly adjustable and being supported along its lateral longitudinal edges by support means secured to one of said frames, said support means being slightly movable toward and away from the center of said guide plate, adjustable support means secured to said frame and engaging a central longitudinal portion of said flexibly adjustable guide plate so that adjustment movement of said adjustable support means will adjust said guide plate to vary its transverse profile, said movable lateral support means moving correspondingly inwardly or outwardly whereby the transverse contour of said guide plate and the operative run of said belt guided thereon may be varied and whereby the adjustment of said frames may vary the spaced distance between said operative runs of said belts.

5. In a device for molding elongated plastic material, the combination of a pair of supporting frames mounted in parallel spaced adjacency, means to yieldably bias said frames toward each other, adjustable leg screws on one of said frames to adjustably space said frames from each other against the action of said biasing means, a pair of belt pulleys rotatively mounted in each of said frames, an endless belt trained over each pair of pulleys, guide plates underlying and supporting adjacently moving runs of said belts, at least one of said guide plates being adjustable to vary its transverse contour and being supported by adjustable support means secured to one of said frames, said support means being adjustable to move said guide plate to vary its transverse profile and the transverse profile of the run of said belt guided along said guide plate, whereby the transverse contour of said guide plate and the operative run of said belt guide thereon may be varied and whereby the adjustment of said frames may vary the space distance between said operative runs of said belts.

6. A molding device comprising in combination a surface upon which a lump of dough may be rolled into an elongated form, an endless belt having a run parallel to and spaced from said surface to roll dough thereon, a guide plate in contact with said run of said belt along said surface and on the side of said run distant from said surface, said belt moving in close contact with said guide plate to shape thereby the transverse profile of said belt, said guide plate being flexible transversely, adjustable support means supporting the lateral longitudinal portions of said plate and other supports supporting its central portion, said supports supporting its central portion being adjustable in a direction to and from said surface, said adjustable support means being adjustable to and from said surface and slightly movable inwardly toward the center of said plate so that said plate in its entirety may be adjusted toward and away from said surface and relative adjustment between said lateral support means and said center supports will vary the transverse profile of said plate.

References Cited in the file of this patent

UNITED STATES PATENTS

| | | |
|---|---|---|
| 1,169,472 | Embrey | Jan. 25, 1916 |
| 1,537,018 | Lauterbur | May 5, 1925 |
| 2,725,019 | Austin | Nov. 29, 1955 |